United States Patent
Shin et al.

(10) Patent No.: US 8,817,712 B2
(45) Date of Patent: Aug. 26, 2014

(54) APPARATUS FOR PROVIDING LOCATION BASED SERVICE AND METHOD THEREOF

(75) Inventors: Kangsoo Shin, Seoul (KR); Jinsung Im, Seoul (KR); Dukho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/816,181

(22) Filed: Jun. 15, 2010

(65) Prior Publication Data

US 2011/0182250 A1    Jul. 28, 2011

(30) Foreign Application Priority Data

Jan. 28, 2010 (KR) ........................ 10-2010-0007858

(51) Int. Cl.
*H04W 4/00* (2009.01)
*H04W 72/00* (2009.01)
*H04W 24/00* (2009.01)
*H04W 4/02* (2009.01)

(52) U.S. Cl.
CPC .. *H04W 4/00* (2013.01); *H04W 4/02* (2013.01)
USPC .......................................... 370/329; 370/338

(58) Field of Classification Search
CPC ......... H04W 4/02; H04W 8/10; H04W 4/008; H04W 4/022; H04W 4/001; H04W 4/023; H04W 8/02; H04M 3/42017
See application file for complete search history.

(56) References Cited

U.S. PATENT DOCUMENTS

| 7,010,294 | B1 * | 3/2006 | Pyotsia et al. ................ 455/420 |
| 7,136,631 | B1 * | 11/2006 | Jiang et al. ................ 455/414.1 |
| 2002/0132621 | A1 * | 9/2002 | Takano et al. ................ 455/435 |
| 2004/0081120 | A1 * | 4/2004 | Chaskar ........................ 370/328 |
| 2012/0003994 | A1 * | 1/2012 | Sylvain ...................... 455/456.1 |

OTHER PUBLICATIONS

Ala-Laurila et al. "Wirless LAN Access Network Architecture for Mobile Operators", IEEE Communications Magazine, Nov. 2001.

* cited by examiner

*Primary Examiner* — Chirag Shah
*Assistant Examiner* — Srinivasa Reddivalam
(74) *Attorney, Agent, or Firm* — Birch, Stewart, Kolasch & Birch, LLP

(57) ABSTRACT

A mobile terminal for providing a location based service includes a short-distance communication module to detect a signal from an access point, to receive server connection information from the access point, to connect to a server belonging to a service area serviced by the access point based on the server connection information, and to automatically receive contents associated with the service area from the server; a display unit to display the received contents; and a control unit to control the short-distance communication module and the display unit.

22 Claims, 17 Drawing Sheets

APPARATUS FOR PROVIDING LOCATION BASED SERVICE AND METHOD THEREOF

CROSS-REFERENCE TO RELATED APPLICATIONS

The present application claims priority under 35 U.S.C. 119 and 35 U.S.C. 365 to Korean Patent Application No. 10-2010-0007858, filed on Jan. 28, 2010, which is hereby incorporated by reference in its entirety.

BACKGROUND

1. Field of the Invention

Embodiments of the invention relate to an apparatus for providing a location based service and a method thereof, and more particularly, to an apparatus and a method thereof, which provide the most necessary or frequently requested information to a mobile terminal that has entered a specific service area, by using a short-distance communication method such as Wireless Fidelity (WiFi).

2. Discussion of the Related Art

Location Based Services (LBS) refer to service systems that provide various services to a user by using location information obtained through a mobile communication network, a Global Positioning System (GPS), or a wireless communication network. Various location determination technologies for the LBS have been developed to be applied to a variety of products. Also, there are various applications that trace the location of a user or provide the user with information on surrounding areas based on the location information of the user.

However, there is a limitation in compatibility of location based information programs. For example, since various kinds of mobile terminals have different platforms from each other, different customized LBSs need to be provided for the different mobile terminals.

Also, related art methods of providing location based information to mobile terminals have limitations in that a user bears charges for provided services in addition to data communication fee (wireless Internet interconnection fee), and needs to perform multiple inputs on his mobile terminal.

SUMMARY OF THE INVENTION

Embodiments of the invention provide an apparatus for providing location based service more efficiently and a method thereof.

Embodiments of the invention also provide an apparatus for providing location based service and a method thereof, which can provide most frequently necessary information to a mobile terminal that has entered a specific service area.

In one embodiment of the invention, a mobile terminal for providing a location based service includes a short-distance communication module configured to detect a signal from an access point, to receive server connection information from the access point, to connect to a server belonging to a service area serviced by the access point based on the server connection information, and to automatically receive contents associated with the service area from the server; a display unit configured to display the received contents; and a control unit configured to control the short-distance communication module and the display unit.

In another embodiment of the invention, a mobile terminal for providing contents a location based service includes a near communication module configured to receive connection information for connection to a server; a short-distance communication module configure to connect to an access point using the connection information and to automatically receive contents from the server belonging to a service area serviced by the access point via the access point; a display unit configured to display the received contents; and a control unit configured to control the near communication module, the short-distance communication module, and the display unit.

In further another embodiment of the invention, a method for providing a location based service using a mobile terminal includes determining that the mobile terminal has entered a service area by detecting a signal from an access point; receiving server connection information from the access point; connecting to a server belonging to the service area serviced by the access point based on the server connection information; receiving contents associated with the service area from the server automatically; and displaying the received contents.

In still further another embodiment of the invention, a method for providing a location based service using a mobile terminal includes receiving server connection information for connection to a server by a near communication module of the mobile terminal; connecting to a server belonging to a service area based on the server connection information; receiving contents associated with the service area from the server automatically; and displaying the received contents.

The details of one or more embodiments of the invention are set forth in the accompanying drawings and the description below. Other features will be apparent from the description and drawings, and from the claims.

DETAILED DESCRIPTION OF THE EMBODIMENTS

Reference will now be made in detail to the embodiments of the present invention, examples of which are illustrated in the accompanying drawings.

Figure 1:
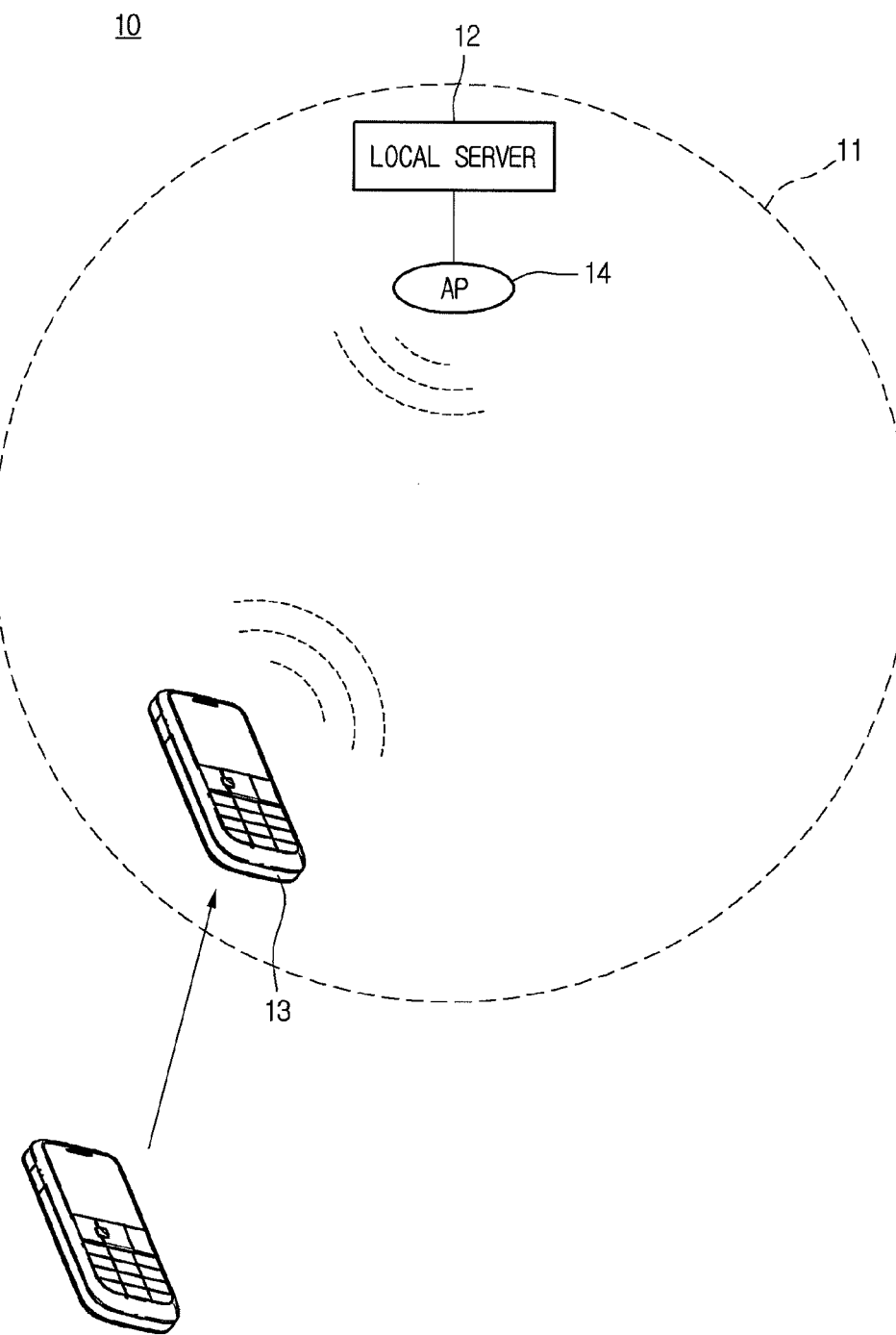
FIG. 1 is a view illustrating a network providing a Location Based Service (LBS) in a local service area according to an embodiment of the invention.

FIG. 1 is a view illustrating a network providing a Location Based Service (LBS) in a local service area according to an embodiment of the invention.

As shown in FIG. 1, a network 10 may include a local server 12, a mobile terminal 13, and at least one Access Point (AP) 14. The local server 12 may provide services in a local service area 11. The mobile terminal 13 may be connected to the local server 12 to receive the services from the local server 12, and may provide the services to a user. The at least one AP 14 may connect the mobile terminal 13 to the local server 12.

The mobile terminal 13 and the AP 14 may be connected (or communicate) through short-distance wireless communications such as Wireless Fidelity (WiFi), but embodiments of the invention are not limited thereto. For example, the short-distance wireless communications may include Bluetooth, Zigbee, and the like. Here, the short-distance wireless communications refer to communication technologies having a coverage within about several tens of meters from the AP 14.

The AP 14 may be provided in a plurality. The AP 14 and the local server 12 may be wiredly or wirelessly connected to each other.

The mobile terminal 13 may be an apparatus equipped with a short-distance communication module such as WiFi. For example, the mobile terminal 13 may include mobile phones, Personal Digital Assistants (PDAs), and notebook computers, but embodiments of the invention are not limited thereto.

The service area 11 may be any of local areas such as department stores, theaters, schools, airports, and buildings. In case of department stores, the AP 14 may be disposed in a plurality on each floor, one for each floor, or there may be a plurality of the APs 14 for each floor. Such also is applicable to theaters, schools, airports, and buildings.

The AP 14 may send beacon signals periodically in the service area 11. When the mobile terminal 13 enters the service area 11, a control unit of the mobile terminal 13 may detect the beacon signals to recognize that the mobile terminal 13 has entered the service area 11.

In one embodiment of the invention, it may be displayed on a display unit of the mobile terminal 13 that the mobile terminal 13 has entered the service area 11.

The local server 12 may include a Dynamic Host Configuration Protocol (DHCP) server that assigns a local Internet Protocol (IP) to the mobile terminal 13. In one embodiment of the invention, the DHCP server may be a separate server independent from the local server 12. In this case, the local server 12, the DHCP server, and the AP 14 may be wiredly or wirelessly connected to one another.

The mobile terminal 13 may inform the local server 12 of the IP address assigned from the DHCP server. The local server 12 may send various data including applications for providing services to the mobile terminal 13 via the IP address.

The local server 12 may provide service information (or content). The service information may include service contents to be provided to the mobile terminal 13 that has entered the service area 11. As described below, the service contents may be downloaded to the mobile terminal 13, or may be provided to the mobile terminal 13 via a web browser.

Figure 2:
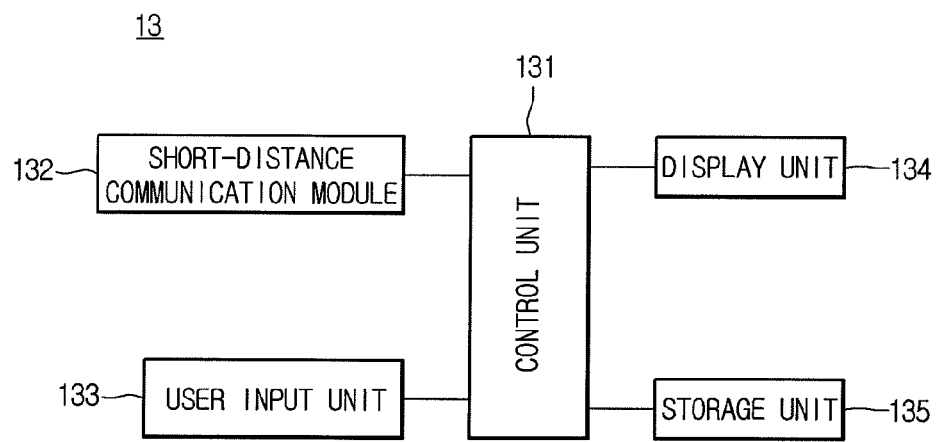
FIG. 2 is a view illustrating a configuration of a mobile terminal according to an embodiment of the invention.

FIG. 2 is a view illustrating a configuration of a mobile terminal 13 according to an embodiment of the invention. As shown in FIG. 2, a mobile terminal 13 may include a short-distance communication module 132, a display unit 134, a user input unit 133, and a control unit 131. All the components of the mobile terminal 13 are operatively coupled and configured. The short-distance communication module 132 may detect signals from an access point (AP) 14, receive server connection information from the access point, and be connected to a server belonging to the service area based on the server connection information to receive service information. The display unit 134 may display the received service information. The user input unit 133 may receive user inputs. The control unit 131 may control the operation of the short-distance communication module 132.

The short-distance communication module 132 may receive connection information necessary for connection to the local server 12 through the AP 14, and be connected to the local server 12 to send/receive data through the AP 14 after the mobile terminal 13 is connected to the local server 12. The connection information may include an IP address of the local server 12 and a Service Set Identifier (SSID) of the AP 14.

In one embodiment of the invention, the local server(s) 12 may be equally configured over an entire service area including the service area 11. That is, the local IP address of the local server 12 may be set to 100.100.100.1 in every service area. Since the IP address of the local server 12 may be equally set in any service area 11, it is unnecessary to receive the IP address of the local server 12 that is one of information necessary for connection to the local server 12.

The short-distance communication module 132, which is an apparatus sending/receiving data within a range of about several tens of meters, may include WiFi, Bluetooth, and Zigbee, but embodiments of the invention are not limited thereto. Hereinafter, WiFi will be described as an example of the short-distance communication module 132.

The display unit 134 may be any of display devices such as Liquid Crystal Displays (LCDs), Organic Light Emitting Displays (OLEDs), and Plasma Display Panels (PDPs).

The control unit 135 may include a general-purpose processor, a microprocessor, a controller, and a microcontroller. The control unit 135 may be configured with any integrated circuit such as Application Specific Integrated Circuit (ASIC) and Flexible Programmable Gate Array (FPGA), hardware, or a combination of software and hardware.

The user input unit 133 may be any of Input/Output (I/O) devices such as keyboards, buttons, touchscreens, and trackballs.

As described below, entrance of the mobile terminal 13 to the service area 11 may be detected by a beacon signal received from the AP 14, or may also be detected by receiving connection information to the local server 12 through a near communication module such as a Near Field Communication (NFC), Radio Frequency Integrated Circuit (RFIC), or Radio Frequency Identification module (RFID) positioned within the service area 11.

As described below, the mobile terminal 13 may download applications or applets from the local server 12, and may execute the applications or the applets to provide services. Also, when the mobile terminal 13 is connected to the local server 12, a web browser including a service menu may be executed. In this case, services corresponding to a menu selected by a user may be received from the local server 12 to be provided to the mobile terminal 13.

In the method of downloading the applications and the applets, after the applications and the applets have been downloaded, most services may be provided by the applications and the applets. On the other hand, in the web browser manner, most services may be provided by communication between the local server 12 and the mobile terminal 13.

Figure 3:
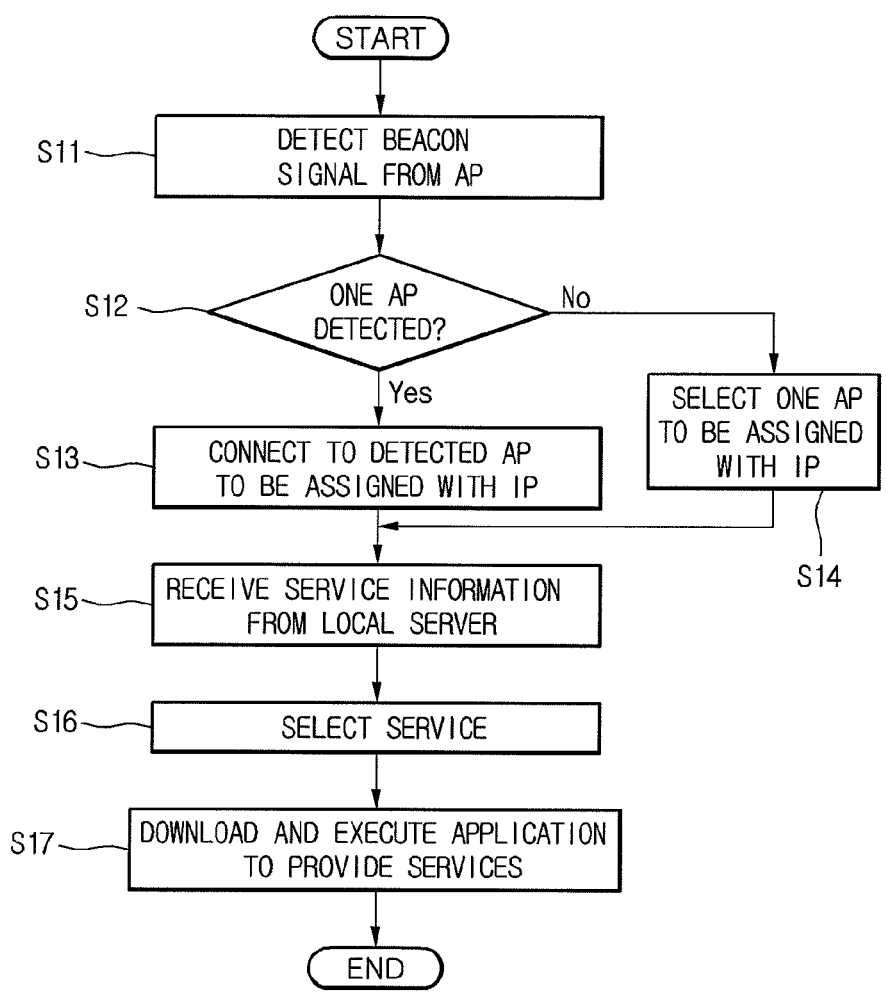
FIG. 3 is a flowchart illustrating a method for a mobile terminal to download services from a local server after the mobile terminal enters a service area according to an embodiment of the invention.

FIG. 3 is a flowchart illustrating a method for a mobile terminal 13 to download services from a local server 12 after the mobile terminal 13 enters a service area 11 according to an embodiment of the invention.

In operation S11, when the mobile terminal 13 enters the service area 11, a beacon signal from an AP 14 may be detected. The control unit of the mobile terminal 13 having detected the beacon signal may detect that the mobile terminal 13 has entered the service area 11.

In operation S12, it may be determined whether the AP sending the beacon signal is singular. There may be a plurality of APs 14 in the service area 11. If there is a plurality of APs 14, one of the APs 14 may be selected for connection.

If there is a single AP 14, in operation S13, the mobile terminal 13 may be connected to the detected AP 14, and may be assigned with an IP Address from a DHCP server that is included in or independent from the local server 12. The AP 14 or the DHCP server may deliver the IP address assigned to the mobile terminal 13 to the local server 12.

If the detected AP 14 exists in a plurality, in operation S14, one of the APs 14 may be selected. The mobile terminal 13 may receive an assigned IP address from the selected AP 14. The mobile terminal 13 may be connected to the AP 14 by a user's selection, or may be automatically connected to the AP 14 having the largest (strongest) signal strength.

Also, the mobile terminal 13 may receive connection information to the local server 12 from the local server 12 via the AP 14. For example, the connection information may include a local IP address of the local server 12 and an SSID of the AP 14. As described above, if the local IP address of the local server 12 is set to the same value at the entire service area, it is unnecessary to receive the local IP address of the local server 12.

In operation S15, the mobile terminal 13 may receive available service information from the local server 12. The service information may include a list of services provided in the service area 11. For example, when the service area 11 is a department store, the list may include a guide map, a discount coupon, and sale information, among others. Also, the provided service may vary with the location of a user in the service area 11. For example, a user may be provided with a guide map, a discount coupon and sale information corresponding to a floor on which the user is located.

In operation S16, a user may select one of provided services. In operation S17, the mobile terminal 13 may download applications or applets for corresponding services from the local server 12, and execute the applications and the applets. A user of the mobile terminal 13 may be provided with various services corresponding to the service area 11 through the downloaded applications or applets.

Figure 4:
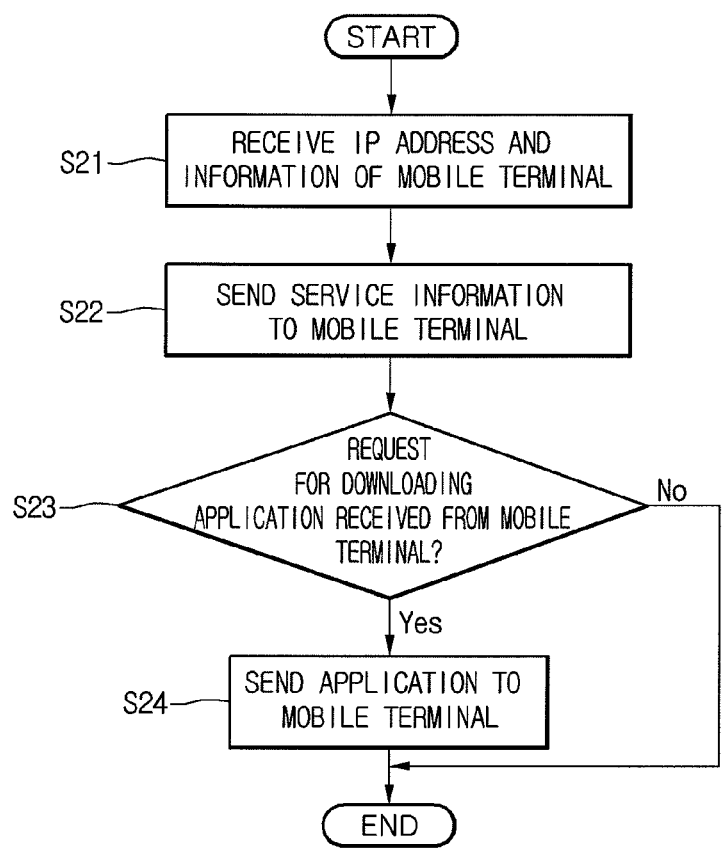
FIG. 4 is a flowchart illustrating a method for a local server to provide services to a mobile terminal through a downloading manner after the mobile terminal enters a service area according to an embodiment of the invention.

FIG. 4 is a flowchart illustrating a method for a local server 12 to provide services to a mobile terminal 13 through a downloading manner after the mobile terminal 13 enters a service area 11 according to an embodiment of the invention.

In operation S21, the local server 12 may receive an IP address assigned to the mobile terminal 13 by an AP 14 or a DHCP server and information on the mobile terminal 13, e.g., MAC address and model name. After the local server 12 receives the information on the mobile terminal 13, the local server 12 may communicate with the mobile terminal 13 via AP 14.

In operation S22, service information including a list of available services may be sent to the mobile terminal 13. In operation S23, it may be determined whether a download request for an application for a specific service has been received from the mobile terminal 13.

If the download request is received, in operation S24, an application is transmitted to the mobile terminal 13. If not, the procedure comes to an end.

Figure 5:
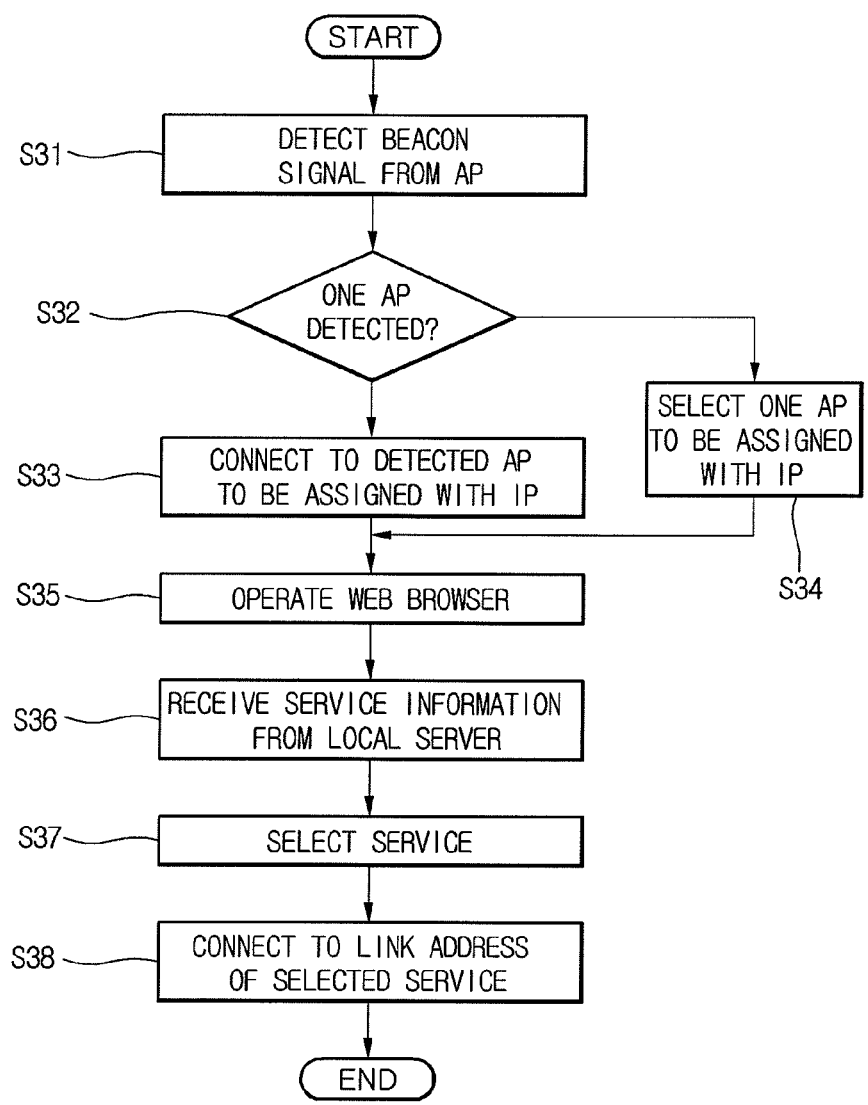
FIG. 5 is a flowchart illustrating a method for a mobile terminal to receive services from a local server through a web browser according to an embodiment of the invention.

FIG. 5 is a flowchart illustrating a method for a mobile terminal 13 to receive services from a local server 12 through a web browser according to an embodiment of the invention.

Operations S31 to S34 may be similar to operations S11 to S14 of FIG. 3. After the mobile terminal 13 is connected to an AP 14 to be assigned with an IP address and receive connection information for connection with the local server 12, in operation S35, a web browser may be executed to receive services. In operation S36, service information received from the local server 12 may be displayed. The service information may include a list of available services or a service menu.

In operation S37, a user may select one of the available services. In operation S38, the user may receive the service information via service links.

Figure 6:
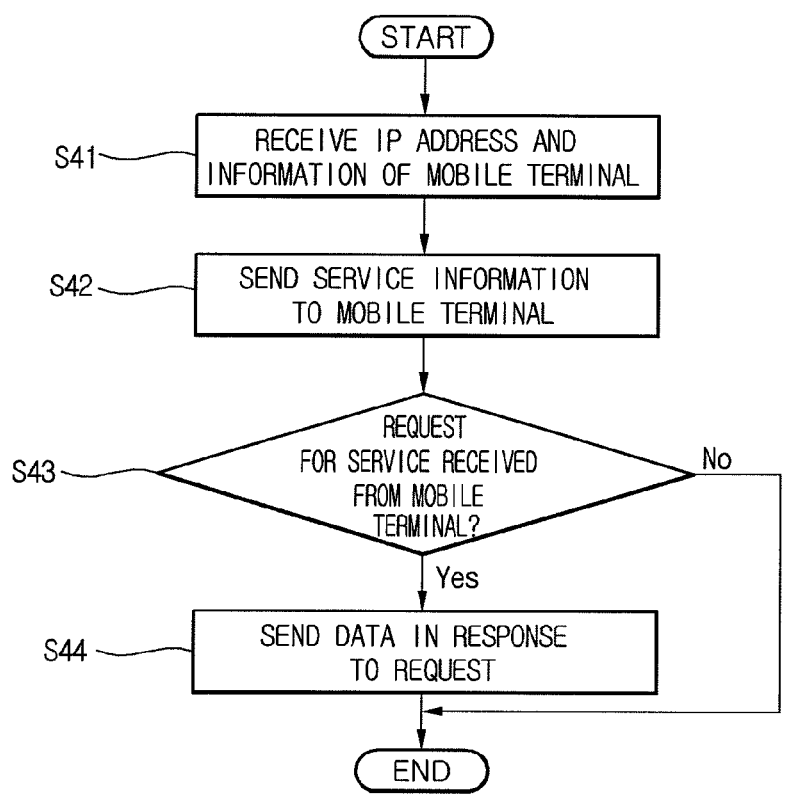
FIG. 6 is a flowchart illustrating a method for a local server to provide services to a mobile terminal through a web browser according to an embodiment of the invention.

FIG. 6 is a flowchart illustrating a method for a local server 12 to provide services to a mobile terminal 13 through a web browser according to an embodiment of the invention.

Operations S41 and S42 may be similar to operations S21 and S22 of FIG. 4. A web browser is executed in the mobile terminal 13, and a user may select a service from a list of the services or a service menu displayed on the web browser. In operation S43, when a request for the selected service is received, in operation S44, corresponding service data may be provided in response to the request.

Figure 7:
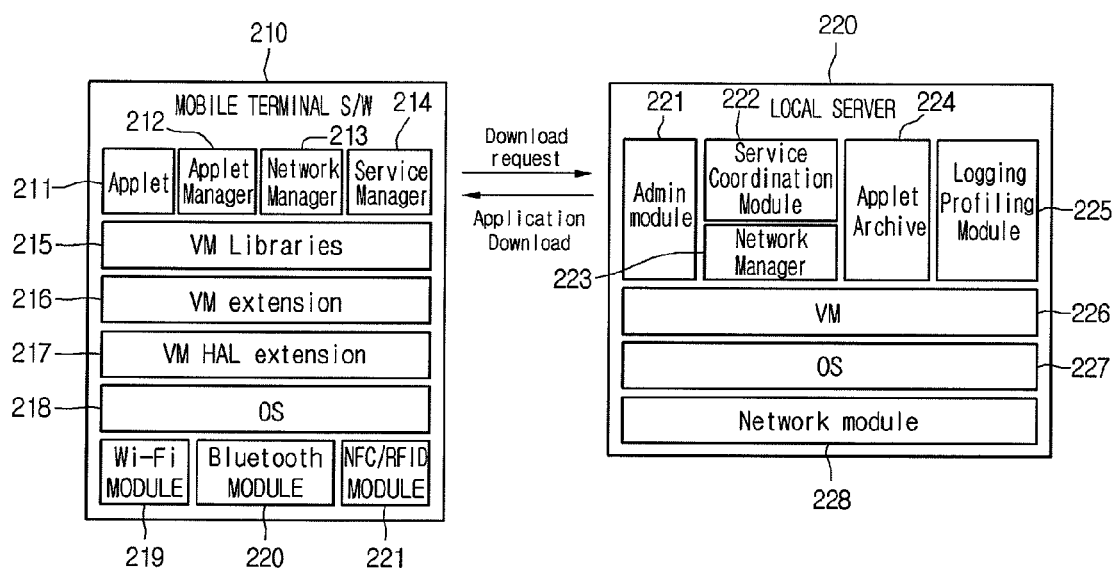
FIG. 7 is a view illustrating configurations of software executed by a mobile terminal and a local server to allow the mobile terminal to download services according to an embodiment of the invention.

FIG. 7 is a view illustrating configurations of software executed by a mobile terminal 210 and a local server 220 to allow the mobile terminal 13 to download services according to an embodiment of the invention.

As shown in FIG. 7, in order to perform functions of the mobile terminal 210, an operating system (OS) 218 may be primarily installed. Virtual Machine (VM) modules 215, 216 and 217 may be installed on the OS 218 to execute applications. Examples of applications may include an applet 211, an applet manager 212, a network manager 213, and a service manager 214. The OS 218 may be provided with drivers for controlling hardware for substantially sending/receiving data. Examples of hardware may include a Wi-Fi module 219, a Bluetooth module 220, and a near communication module 221 such as Near Field Communication-Radio Frequency Identification (NFC-RFID).

Hereinafter, the functions of components of software operating the mobile terminal 210 will be described in detail.

A Virtual Machine Hardware Abstract Layer (VM HAL) extension module 217 may provide the fewest Advanced Programmable Interface (API) sets to maintain the compatibility of contents. This may allow mobile terminals having different hardware interfaces to be compatible with one interface.

A VM extension module 216 may transform a completed program into an intermediate code that can be operated in a virtual machine and allow the virtual machine to translate the corresponding codes into machine language for actual processors (e.g., CPU). This is a known technology through JAVA language, and is being applied to wireless Internet platforms.

A VM library module 215 may be a library added with an Extensible Markup Language (XML) supporting function for connection with a local server and a library for controlling the VM extension module 216.

The applet module 211 may be a component executed in another program. The applet module 211 may be implemented using functions that the above VM library module 215 supports.

The applet manager 212 may be a module that installs and executes the above applet software. The network manager 213 may serve to find an appropriate neighboring AP for connection. The service manager 214 may communicate with a service management module 222 of the local server 220, and may allow services and applications provided from the local server 220 to be automatically downloaded and executed, thereby minimizing the number of user inputs.

The operating system 227 may also be primarily installed in the local server 220. The virtual machine 226 for application operation may be installed on the operating system 227. Applications such as an admin module 221, a service coordination module 222, a network manager 223, an applet archive 224, and a logging profiling module 225 may be installed and executed based on the virtual machine 226. The operating system 227 may be equipped with a driver for operating a network module that is a hardware for substantial data communication.

Hereinafter, the functions of the respective components of software for operation of the local server 220 will be described in detail.

The VM module 226 may play the same role as the VM extension 216 and the VM library 215 of a software of the mobile terminal 210. The admin module 221 may manage all services using an administrator account. The service coordination module 222 may receive IP address information in linkage with a DHCP server connected to the local server 12 to provide location based information. The network manager 223 may provide service-related information to the mobile terminal 210. The applet archive 224 may store a list or a directory for sending the applets. The logging profiling module 225 may store information on a user of the mobile terminal 210.

As described above, VM based platform may enable delivery and installation of applications, and may be applied to various terminals through the VM HAL extension, thereby improving extensibility.

Figure 8:
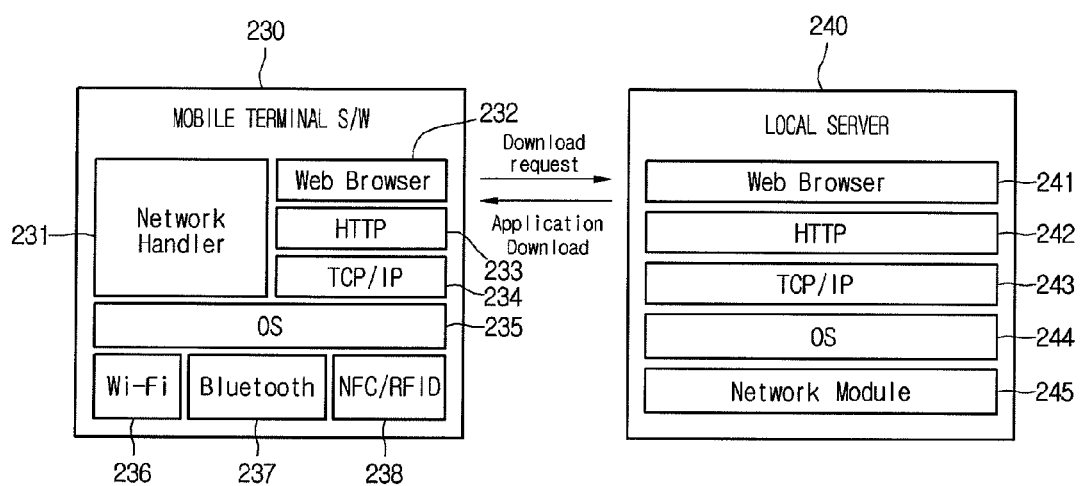
FIG. 8 is a view illustrating a configuration of software in a mobile terminal and a local server to implement the methods of FIGS. 5 and 6 according to an embodiment of the invention.

FIG. 8 is a view illustrating a configuration of software in a mobile terminal and a local server to implement the methods of FIGS. 5 and 6 according to an embodiment of the invention.

In the web browser based service as described above, a mobile terminal may operate a web browser, and a local server may provide services by performing operations similar to a web server.

Looking at the software configuration of the mobile terminal 230, an operating system 235 may be provided. Based on the operating system 235, a module 234 providing a TCP/IP protocol, a module 233 providing a HTTP protocol, a network handler 231 handling the two protocols, and a web browser 232 may be executed. Also, drivers may be installed in the operating system 235 to control hardware such as Wi-Fi 236, Bluetooth 237, and NFC/RFID tag module 238 for near communication.

The network handler 231 may allow the mobile terminal to communicate data with the local server using TCP/IP and HTTP protocols via the short-distance communication module.

The web browser module 232 may receive data from the local server, and display the data on a screen.

The software of the local server 240 may allow the local server to communicate with the mobile terminal using the HTTP 242 and TCP/IP 243 protocols. In this case, substantial communication may be performed using the network module 245 for driving network hardware. A Driver may be installed in the operating system 244 to drive the network module 245. The web server 241 may provide an application to provide services.

Based on such a web browser based platform, contents to be provided to the mobile terminal can be easily created. The creation of the contents may be performed using HTML. When a function corresponding to applications is used in a web page, the creation of the contents may be implemented using technologies such as JavaScript, Flash, and Asynchronous JavaScript and XML (AJAX). Also, the contents may be operated in a variety of devices without a separate additional module.

Software described with reference to FIGS. 7 and 8 may be implemented using certain executable codes, and may be stored in computer-readable storage media, for example, hard disks, flash memories, optical disks, and magnetic disks.

Figure 9:
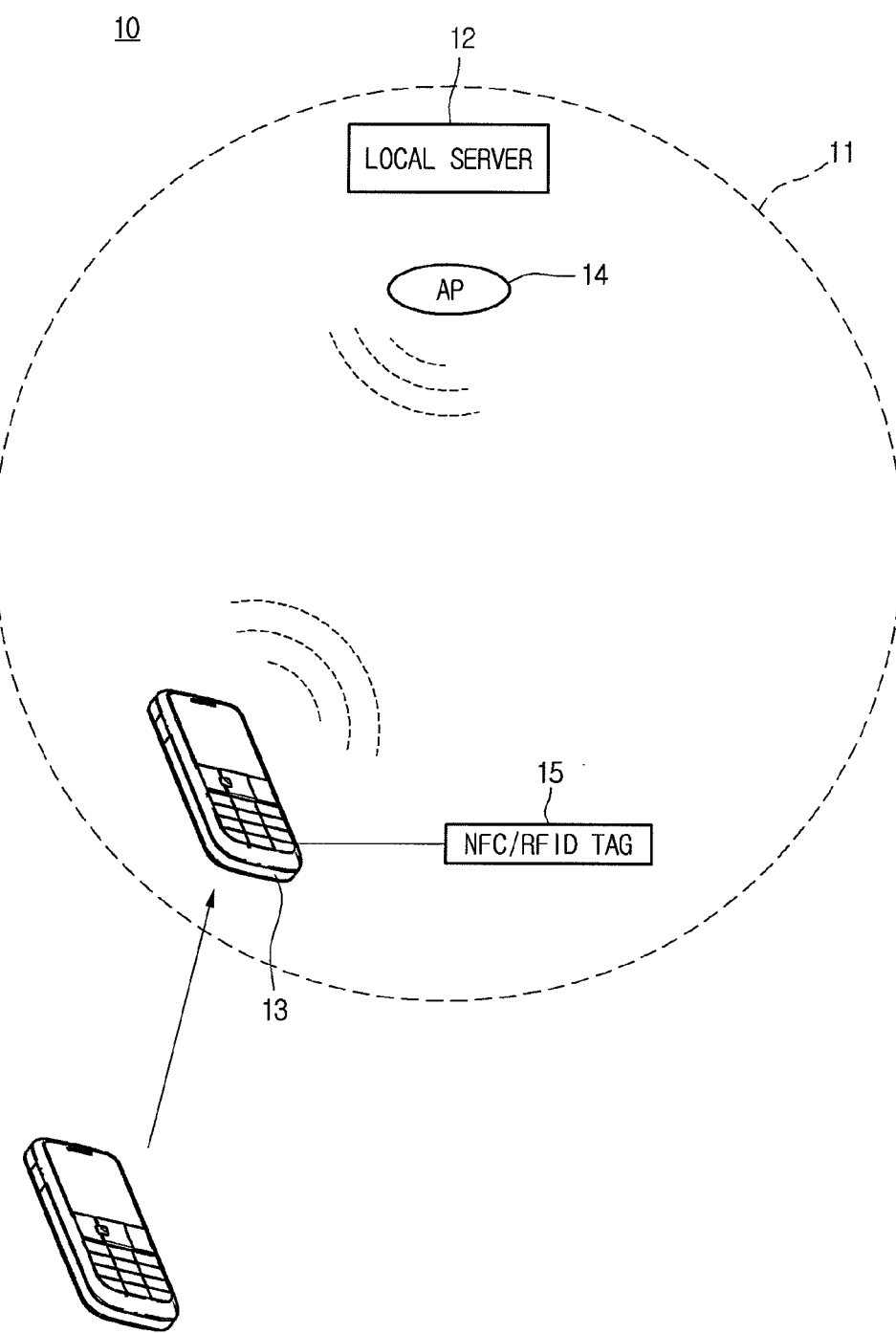
FIG. 9 is a view illustrating a network providing services to a mobile terminal in a local area according to another embodiment of the invention.

FIG. 9 is a view illustrating a network providing services to a mobile terminal in a local area according to another embodiment of the invention.

Unlike the previous embodiment of the invention, a mobile terminal 13 may be equipped with a near communication module, for example, a NFC receiver or an RFID receiver. An NFC or an RFID tag 15 may be installed in a service area 11 or at the entrance to the service area 11.

When a user moves the mobile terminal 13 near to the NFC or RFID tag 15 upon entrance to the service area 11, the mobile terminal may receive connection information to be provided with services from the local server 12. Here, the connection information may include connection information necessary for communication of the mobile terminal 13 with the local server 12. For example, the connection information may include information on an AP, an SSID of the AP, a local IP address of the local server 12, and the service area 11.

NFC or RFID communication refers to a communication technology that supports wireless data communication within a range of about several centimeters unlike short-distance wireless communications that support communication within a range of about several tens of meters. Unlike the short-distance wireless communication, the NFC or RFID communication may automatically achieve predetermined data communication without a separate configuration within a near distance.

For example, when the service area 11 is a department store, an NFC or RFID tag may be disposed at the entrance of the department store. When a user moves the mobile terminal 13 equipped with an NFC or RFID near communication module near to the NFC or RFID tag 15, AP information designated to be connected at a current location of the user, i.e., the entrance of the department store may be delivered to the mobile terminal 13. Then, the mobile terminal 13 may be immediately connected to the designated AP.

Unlike the methods described with reference to FIGS. 1 to 8, this method need not receive a beacon signal from the AP and process the received beacon signal. Also, even when the APs exist in a plurality, a process of determining which AP the mobile terminal should be connected to may be omitted. Furthermore, since the connection information that is necessary for communication of the mobile terminal 13 with the local server 12 may be more certainly (or reliably) provided, stability of communication connection can be improved.

Figure 10:
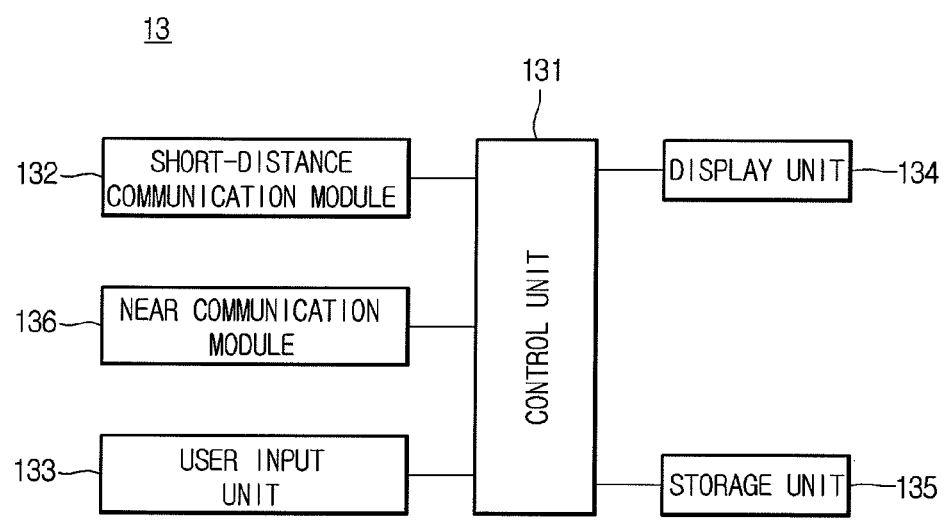
FIG. 10 is a view illustrating a configuration of a mobile terminal usable in the network of FIG. 9.

FIG. 10 is a view illustrating a configuration of a mobile terminal 13 usable in the network of FIG. 9.

Except additional short-distance module 136, other components are similar to the description of the mobile terminal 13 of FIG. 2. All the components of the mobile terminal 13 are operatively coupled and configured. The near communication module 136 may be any of communication modules serving as an NFC receiver, an RFID receiver, and devices similar thereto.

Figure 11:
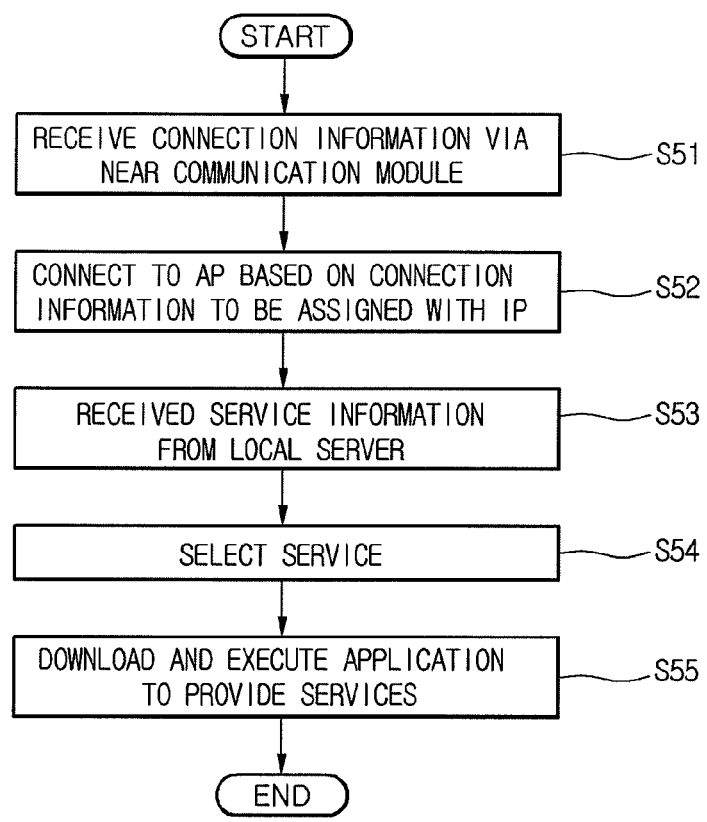
FIG. 11 is a flowchart illustrating a method of providing an LBS to a mobile terminal equipped with a near communication module through a downloading manner according to an embodiment of the invention.

FIG. 11 is a flowchart illustrating a method of providing an LBS to a mobile terminal equipped with a near communication module through a downloading manner according to an embodiment of the invention.

In operation S51, a mobile terminal 13 may enter the service area 11 and receive connection information for connection to a local server 12 from the near communication module. For example, the connection information may include information on an AP to be connected and information on the service area 11.

In operation S52, the mobile terminal 13 may be connected to a designate AP based on the connection information, and may be connected to the local server 12 via the AP. An IP address may be assigned to the mobile terminal 13 by a DHCP server installed in the local server 12 or existing independently from the local server 12.

In operation S53, available service information may be received from the local server 12. The service information may include a list of services provided in the service area 11. For example, when the service area 11 is a department store, the list may include a guide map, a discount coupon, and sale information. Also, the provided service may vary with the location of a user in the service area 11. For example, a user may be provided with a guide map, a discount coupon and sale information corresponding to a floor on which the user is located In operation S54, a user may select one of provided services. In operation S55, the mobile terminal 13 may download applications or applets for corresponding services from the local server 12, and execute the applications and the applets. A user of the mobile terminal 13 may be provided with various services corresponding to the service area 11 through the downloaded applications or applets.

Figure 12:
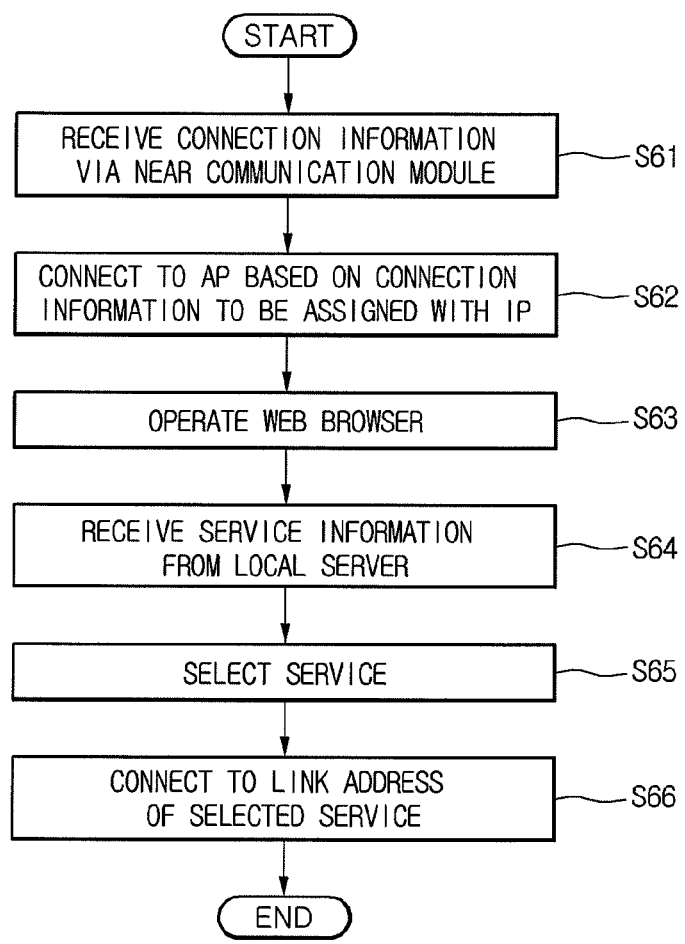
FIG. 12 is a flowchart illustrating a method of receiving services from a local server through a web browser according to an embodiment of the invention.

FIG. 12 is a flowchart illustrating a method of receiving services from a local server 12 through a web browser according to an embodiment of the invention.

Operations S61 and S62 may be similar to operations S51 to S52 of FIG. 11. After the mobile terminal 13 is connected to an AP 14 to be assigned with an IP address, in operation S63, a web browser may be executed to receive services. In operation S64, service information received from the local server 12 may be displayed. The service information may include a list of available services or a service menu.

In operation S65, a user may select one of the available services. In operation S66, the user may receive the service information via service links.

In a network system of FIG. 9, operations performed in the local server 12 may be similar to that of FIG. 4 in a downloading manner and that of FIG. 6 in a web browser based manner.

Figure 13:
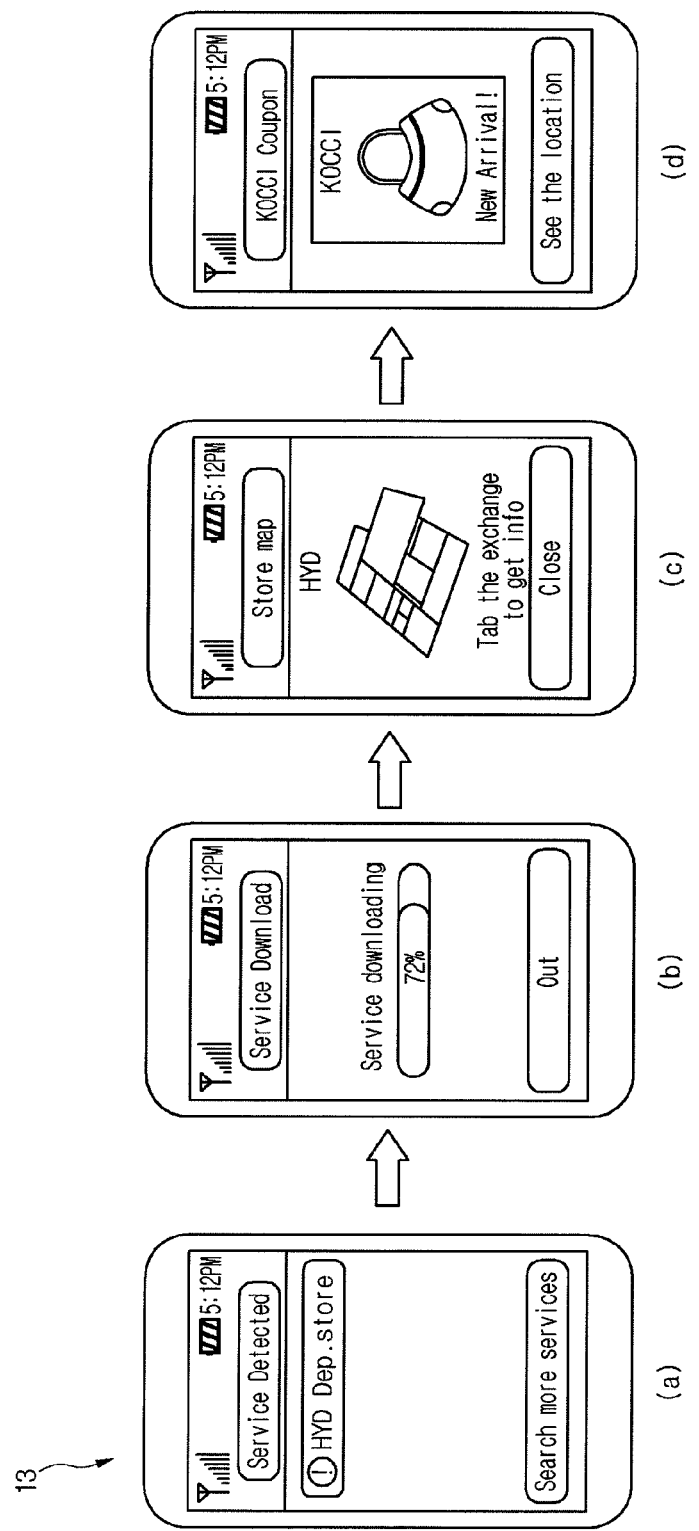
FIGS. 13 to 15 illustrate views of services provided to a mobile terminal in a service area according to an embodiment of the invention.

FIG. 13 illustrates views of services provided to a mobile terminal 13 when a service area 11 is a department store according to an embodiment of the invention.

It will be assumed in this embodiment of the invention that a mobile terminal 13 is a so-called touchscreen phone equipped with a touch screen. It will be apparent to those skilled in the art that the following description may be applied to other mobile phones and mobile terminals equipped with short-distance communication modules.

When the mobile terminal 13 enters the department store, as described in FIG. 1, the mobile terminal 13 may receive a beacon signal, or a control unit of the mobile terminal 13 may recognize that the mobile terminal 13 has entered the service area 11, i.e., the department store by the near communication module as described in FIG. 9.

When recognized that the mobile terminal 13 has entered the department store, it may be displayed as shown in (a) of FIG. 13 that the mobile terminal 13 has entered the service area 11. For example, a message showing the name of the department store or detection of services may be displayed.

In a downloading manner, an application or an applet may be automatically downloaded and executed to provide services as shown in (b) FIG. 13. However, the web browser manner of the previous embodiment of the invention may include operating a web browser instead of downloading.

When the downloading is completed, a main screen for providing services may be displayed as shown in (c) FIG. 13. The main screen may include a guide map as shown in (c) of FIG. 13. When a user touches or selects a desired store in the guide map, information on products of the selected store, e.g., new products may be displayed on the main screen as described in (d) of FIG. 13.

The configuration of the main screen shown in FIG. 13C may vary according to embodiments of the invention. For example, a menu for providing services or advertisements may be displayed instead of the guide map. The information screen of the store shown in FIG. 13D may also be variously configured according to embodiments of the invention.

In one embodiment of the invention, the local server 12 may also provide customized services to a user based on user information. For example, the local server 12 of FIG. 1 or 9 may provide customized information to a user using the user information such as age, sex, birthday, favorites and the like. For example, when a user registers his/her own private information at a department store that the user frequently visits, the user may be automatically guided to a store (or department) that the user frequently visits upon his/her entrance to the department store. Also, when the user visits the department store on his/her birthday, an electronic discount coupon may be provided to the user via communication. Furthermore, a variety of available discount information may be provided to the user.

Figure 14:
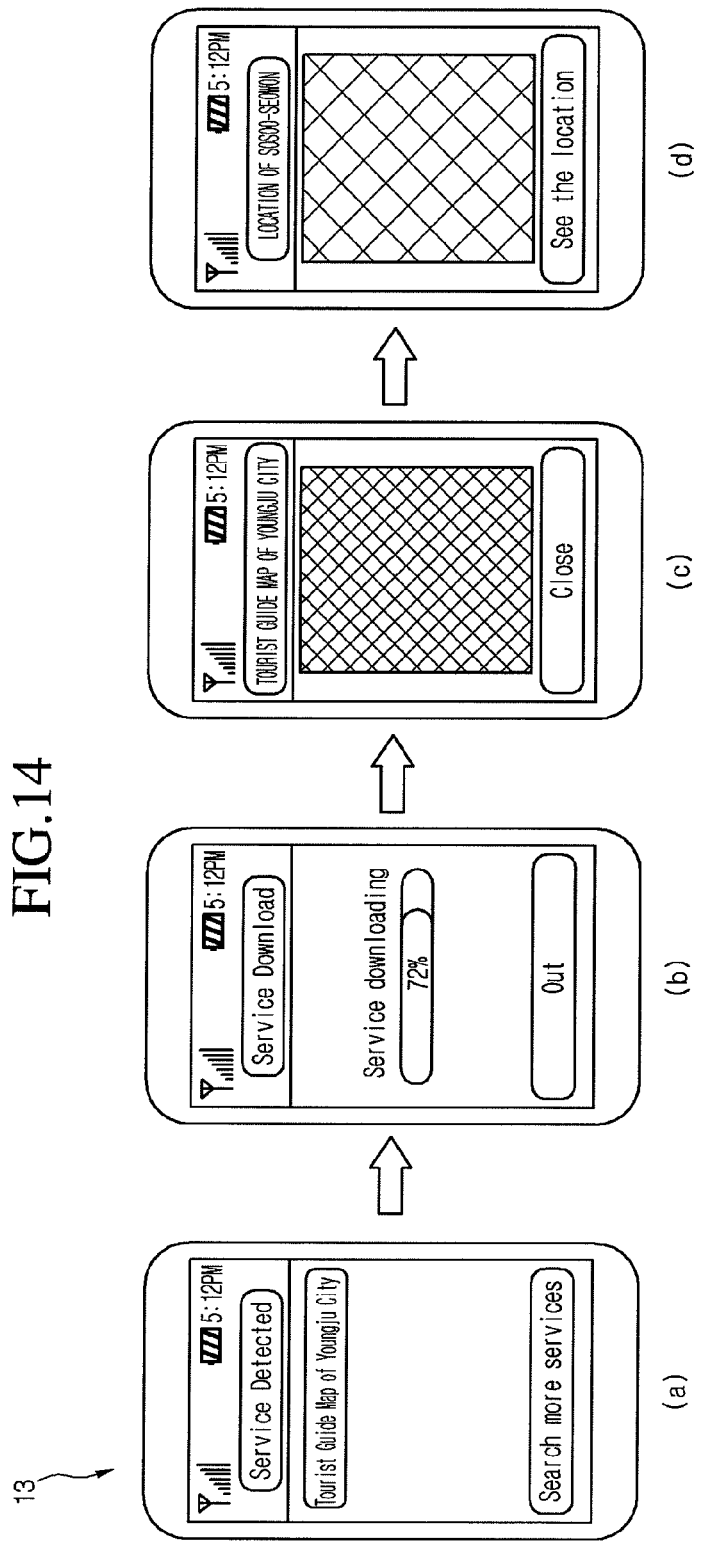

FIG. 14 illustrates views of services provided to a mobile terminal 13 when a service area 11 is a specific geographical area according to another embodiment of the invention.

When a user enters a service area called 'YoungJu-city', the mobile terminal 13 may receive a beacon signal from an AP, or may be connected to a local server via the AP disposed in the service area by communicating with a near communication module.

When connected to a local server, it may be displayed on the mobile terminal 13 that the mobile terminal 13 has entered the service area, 'YoungJu-city' as shown in (a) of FIG. 14.

For example, a message showing the name of the service area and the detection of services may be displayed.

In a downloading manner, an application or an applet may be automatically downloaded and executed to provide services as shown in (b) of FIG. 14. However, the web browser manner of the previous embodiment of the invention may include operating a web browser instead of downloading.

When the downloading is completed, a main screen for providing services may be displayed as shown in (c) of FIG. 14. The main screen may include a guide map of YoungJu city as shown in (c) of FIG. 14. When a user touches or selects a desired area in the guide map, information on the selected area, e.g., detailed view of the selected area may be displayed on the main screen as described in (d) of FIG. 14.

The configuration of the main screen shown in (c) of FIG. 14 may vary according to embodiments of the invention. For example, a menu for providing services or advertisements may be displayed instead of the guide map. The detailed view of the selected area shown in (d) of FIG. 14 may also be variously configured according to embodiments of the invention. For example, information on transportation and famous sites may be displayed.

Figure 15:
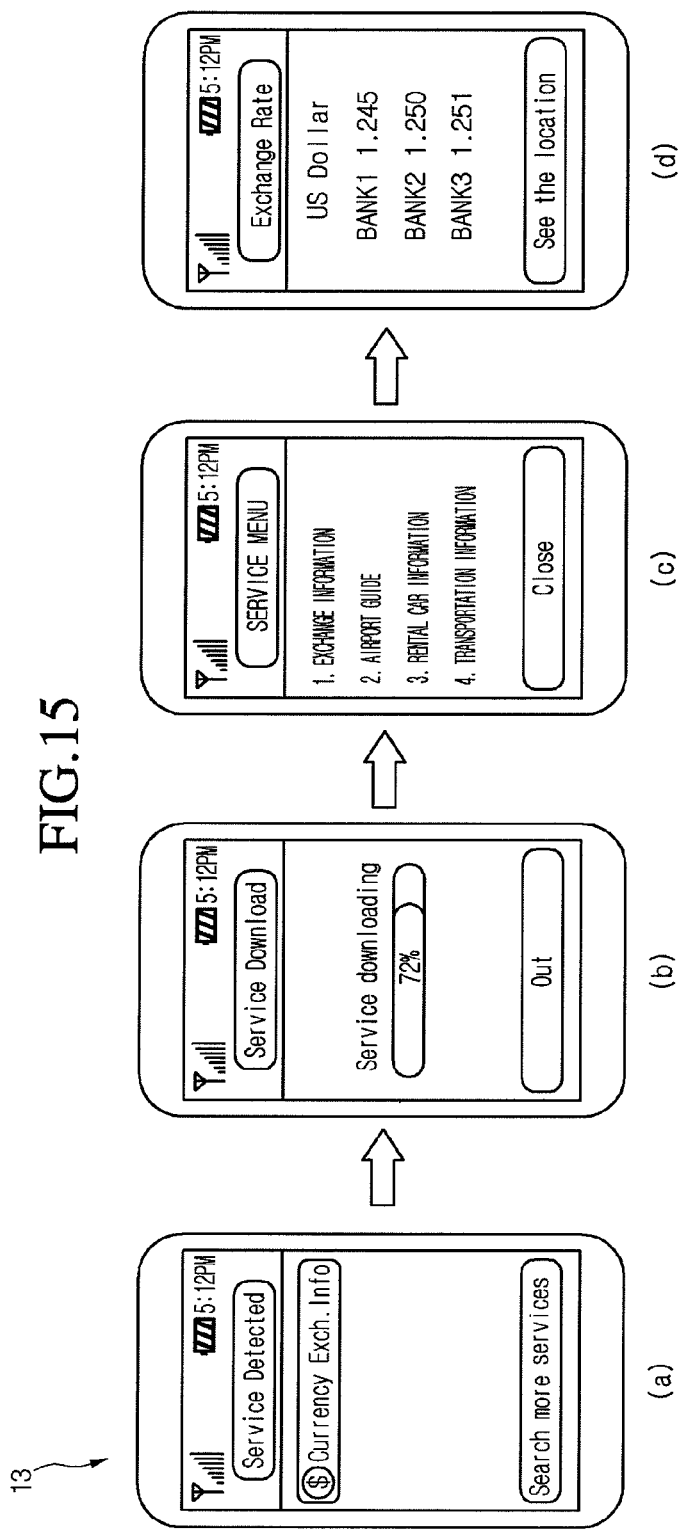

FIG. 15 is a view illustrating currency exchange information services provided to a mobile terminal 13 when a service area 11 is an airport according to another embodiment of the invention.

When a user enters a service area, i.e., an airport, the mobile terminal 13 may receive a beacon signal from an AP, or may be connected to a local server of the airport via the AP disposed in the service area in communication with a near communication module.

When connected to a local server, it may be displayed on the mobile terminal 13 that the mobile terminal 13 has entered the airport service area as shown in (a) of FIG. 15. For example, a message showing the name of the service area and the detection of services may be displayed.

In a downloading manner, an application or an applet may be automatically downloaded and executed to provide services as shown in (b) of FIG. 15. However, the web browser manner of the previous embodiment of the invention may include operating a web browser instead of downloading.

When downloading is completed, a main screen may be displayed to provide services as shown in (c) of FIG. 15. The main screen may include exchange information, airport information, rental car information, and transportation information as shown in (c) of FIG. 15. For example, when a user selects the exchange information, the exchange information of each bank may be displayed as shown in (d) of FIG. 15.

Figure 16:
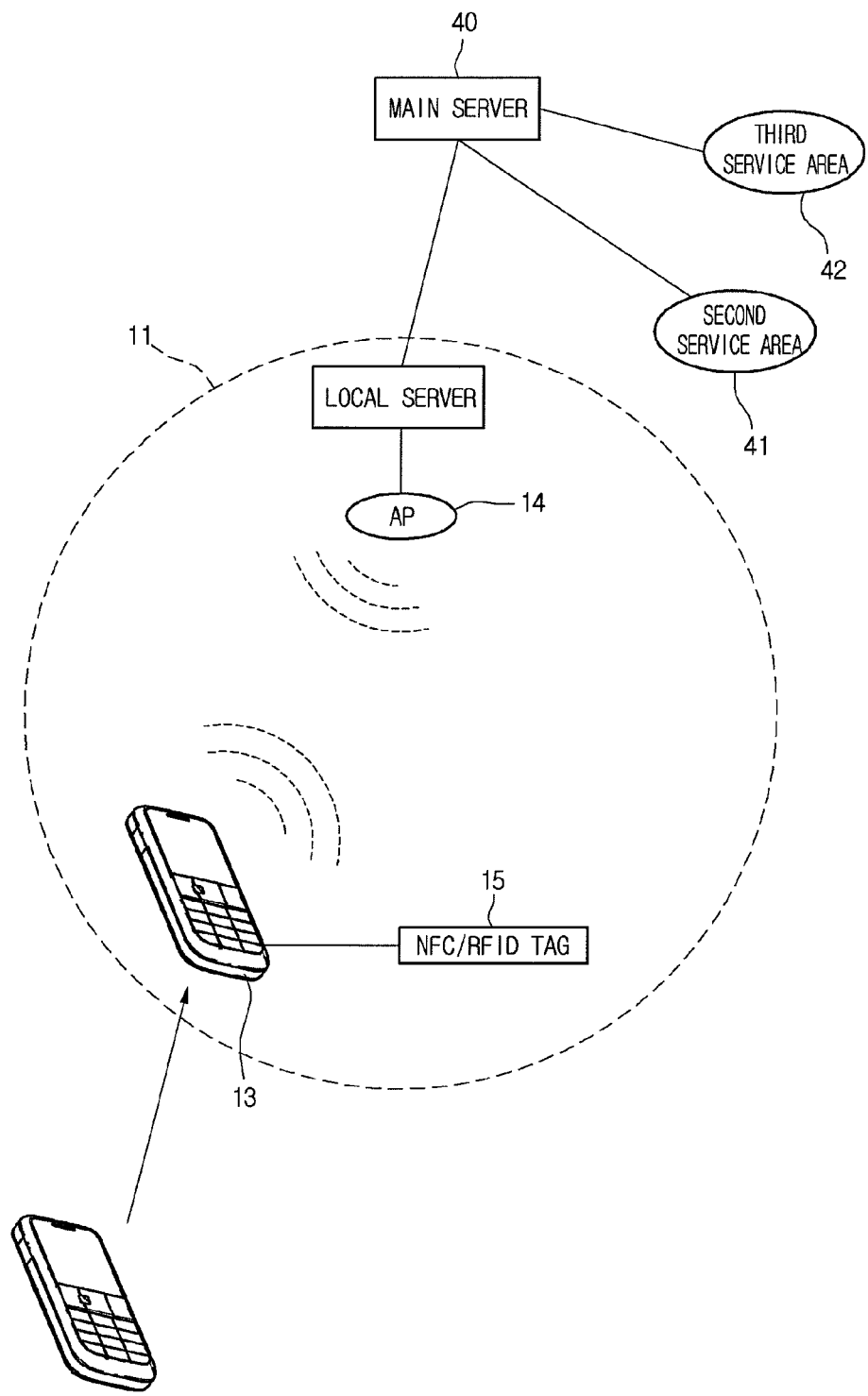
FIG. 16 is a view illustrating a network in which a local server provides additional information in communication with another server according to still another embodiment of the invention.

FIG. 16 is a view illustrating a network in which a local server provides additional information in communication with another server according to still another embodiment of the invention. When a user is located in the service area that requires receiving information from another server other than the local server, information that is difficult to provide in the local server, e.g., real-time transportation information, can be provided.

As shown in FIG. 16, a local server 12 in a first service area 11 may be wiredly or wirelessly connected to a main server 40 located to the outside of the first service area 11. The main server 40 may provide service information to a plurality of service areas 41 and 42 besides the first service area 11. Similarly to the first service area 11, a local server and an AP may be disposed in the second and third service areas 41 and 42. When a mobile terminal 13 enters the service area, the mobile terminal 13 may be provided with service information.

In one embodiment of the invention, if the first service area 11 is a bus stop, a user may receive necessary information at the bus stop from the local server.

However, this information may not be provided by the local server. This information may require real-time updates, and may be provided from a server or an apparatus in another location.

In one embodiment of the invention, the local server 12 may be connected to another server, i.e., the main server 40 providing bus location information to receive corresponding information, and may provide services using the received information.

The present embodiment of the invention may be applied to a certain system that requires information input from the outside of the service area 11.

Figure 17:
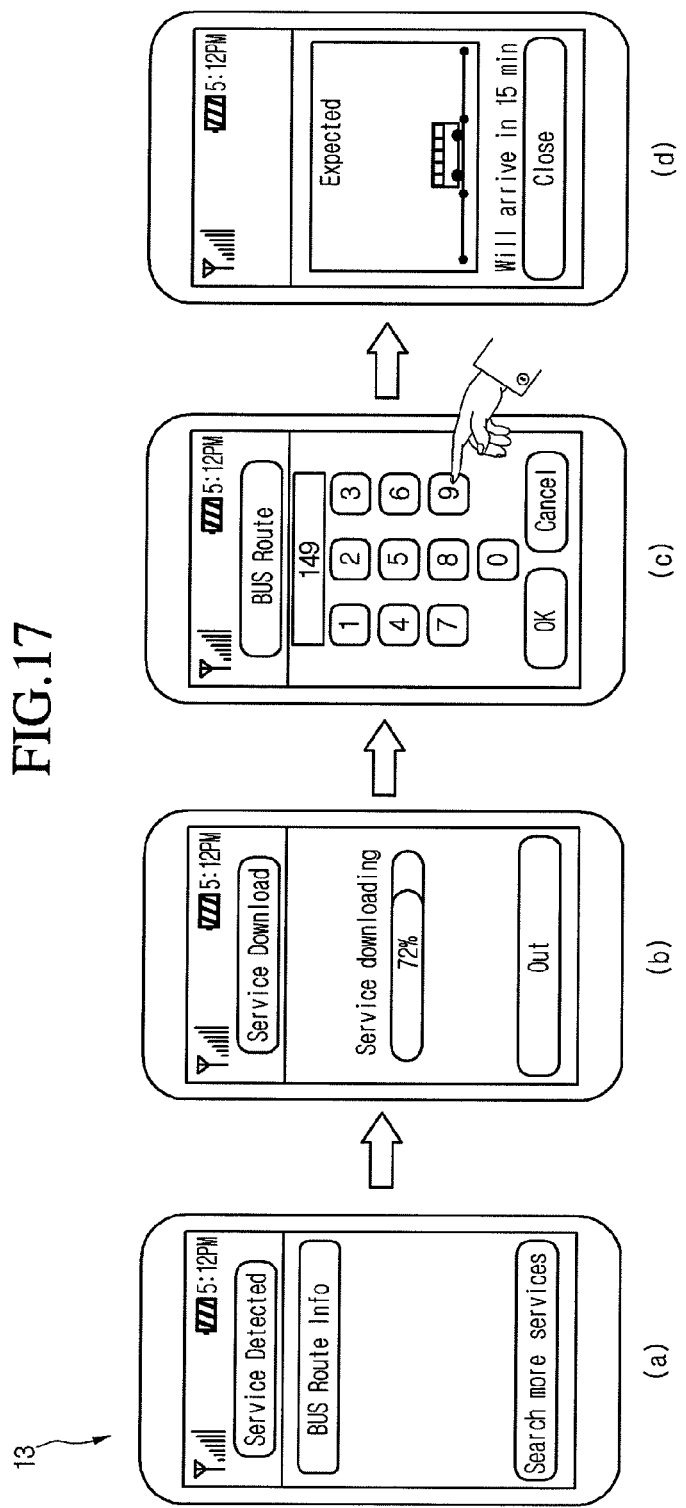
FIG. 17 illustrates views of an example service provided after a local server has received information from a server or a communication apparatus that is located out of a service area according to an embodiment of the invention.

FIG. 17 is a view illustrating an exemplary service provided after a local server has received information from a server or a communication apparatus that is located outside of a service area according to an embodiment of the invention. FIG. 17 illustrates an example of providing real-time transportation information of a public bus.

When a user enters a bus stop or an area adjacent thereto, a mobile terminal 13 may receive a beacon signal from an AP, or may be connected to a local server of the bus stop via the AP disposed in a service area by communicating with a near communication module.

When the mobile terminal 13 is connected to the local server, it may be displayed on the mobile terminal 13 that the mobile terminal 13 has entered the service area, the bus stop as shown in (a) of FIG. 17. For example, a message showing the name of the service area and the detection of services may be displayed.

In a downloading manner, an application or an applet may be automatically downloaded and executed to provide services as shown in (b) of FIG. 17. However, the web browser manner of the previous embodiment of the invention may include operating a web browser instead of downloading.

When the downloading is completed, a bus number input menu may be displayed as shown in (c) of FIG. 17. The main screen may display the current location of the bus and the expected arrival time of the bus. The real-time information of the bus may be provided from another server or communication device.

According to embodiments of the invention, a user of a mobile terminal can be provided with most necessary information in a corresponding area without paying a separate communication charge.

Also, a user need not search for information on a specific area in advance before going to the area.

Furthermore, a user of a mobile terminal can easily be provided with the most necessary service in a current place, thereby maximizing the satisfaction of the user.

Although embodiments of the invention have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A mobile terminal for providing a location based service to a user, the mobile terminal comprising:

a short-distance communication module configured to detect a signal from an access point, to receive server connection information from the access point, to connect to a server belonging to a service area serviced by the access point based on the server connection information, and to automatically receive contents associated with the service area from the server;

a display unit configured to display the received contents; and a control unit configured to:

when the service area includes a specific area which the user has frequently visited, receive a user private information from the user and register the received user private information at the server of the service area including the specific area, and when the mobile terminal enters the service area including the specific area, provide a customized service to the user, which is provided from the server, according to the registered user private information, wherein the customized service includes a guide service to guide the specific area which the user has visited frequently in the service area, when the mobile terminal enters the service area, display a message for notifying that the mobile terminal enters the service area, download and execute automatically an application for providing the service related to the service area, display a main screen including a guide map for guiding the service area when the downloading of the application is completed, wherein the guide map represents a plurality of stores located in the service area, when one among the plurality of stores is selected by the user, display information on products provided by a selected store, wherein an Internet Protocol (IP) address of the server is the same as a server of another service area, wherein the server connection information does not include the Internet Protocol (IP) address of the server, and wherein the customized service further includes providing, to the user in the service area, real-time transportation schedule information on an area outside of the service area, the real-time transportation schedule information being received by the mobile terminal from another server or communication device located outside of the service area.

2. The mobile terminal according to claim 1, wherein the short-distance communication module further receives the application from the server belonging to the service area.

3. The mobile terminal according to claim 1, wherein the contents comprise information for accessing services, and the control unit further executes a web browser for providing at least one service selected by the user.

4. The mobile terminal according to claim 1, wherein the access point is provided in a plurality, and the short-distance communication module connects to an access point having a strongest signal strength from among the plurality of access points.

5. The mobile terminal according to claim 1, wherein the server belonging to the service area comprises a Dynamic Host Configuration Protocol (DHCP) server, and provides the content using the Internet Protocol (IP) address provided by the DHCP server.

6. A mobile terminal for providing a location based service to a user, the mobile terminal comprising:

a near communication module configured to receive connection information for connection to a server;

a short-distance communication module configured to connect to an access point using the connection information and to automatically receive contents from the server belonging to a service area serviced by the access point via the access point;

a display unit configured to display the received contents; and a control unit configured to:

when the service area includes a specific area which the user has frequently visited, receive a user private information from the user and register the received user private information at the server of the service area including the specific area, and when the mobile enters the service area including the specific area, provide a customized service to the user, which is provided from the server, according to the registered user private information, wherein the customized service includes a guide service to guide the specific area which the user has visited frequently in the service area, when the mobile terminal enters the service area, display a message for notifying that the mobile terminal enters the service area, download and execute automatically an application for providing the service related to the service area, display a main screen including a guide map for guiding the service area when the downloading of the application is completed, wherein the guide map represents a plurality of stores located in the service area, when one among the plurality of stores is selected by the user, display information on products provided by a selected store, wherein an Internet Protocol (IP) address of the server is the same as a server of another service area, wherein the server connection information does not include the Internet Protocol (IP) address of the server, and wherein the customized service further includes providing, to the user in the service area, real-time transportation schedule information on an area outside of the service area, the real-time transportation schedule information being received by the mobile terminal from another server or communication device located outside of the service area.

7. The mobile terminal according to claim 6, wherein the short-distance communication module further receives the application from the server belonging to the service area.

8. The mobile terminal according to claim 6, wherein the contents comprise information for accessing services, and the control unit further executes a web browser for providing at least one service selected by the user.

9. The mobile terminal according to claim 6, wherein the access point is provided in a plurality, and the short-distance communication module connects to an access point having a strongest signal strength from among the plurality of access points.

10. The mobile terminal according to claim 6, wherein the server belonging to the service area comprises a DHCP server, and provides the content using the Internet Protocol (IP) address provided by the DHCP server.

11. The mobile terminal according to claim 6, wherein the near communication module comprises at least one of a Near Field Communication (NFC) module and a Radio Frequency Identification (RFID) module.

12. A method for providing a location based service to a user using a mobile terminal, the method comprising:

determining that the mobile terminal has entered a service area by detecting a signal from an access point;

receiving server connection information from the access point;

connecting to a server belonging to the service area serviced by the access point based on the server connection information;

receiving contents associated with the service area from the server automatically; and displaying the received contents, wherein the receiving contents associated with the service area from the server automatically comprises:

when the service area includes a specific area which the user has frequently visited, receiving a user private information from the user and registering the received user private information at the server of the service area including the specific area, and when the mobile terminal enters the service area including the specific area, providing a customized service to the user, which is provided from the server, according to the user private information, wherein the customized service includes a guide service to guide the specific area which the user has visited frequently in the service area, when the mobile terminal enters the service area, display a message for notifying that the mobile terminal enters the service area, download and execute automatically an application for providing the service related to the service area, display a main screen including a guide map for guiding the service area when the downloading of the application is completed, wherein the guide map represents a plurality of stores located in the service area, when one among the plurality of stores is selected by the user, display information on products provided by a selected store, wherein an Internet Protocol (IP) address of the server is the same as a server of another service area, wherein the server connection information does not include the Internet Protocol (IP) address of the server, and wherein the customized service further includes providing, to the user in the service area, real-time transportation schedule information on an area outside of the service area, the real-time transportation schedule information being received by the mobile terminal from another server or communication device located outside of the service area.

13. The method according to claim 12, further comprising receiving an available application from the server belonging to the service area.

14. The method according to claim 12, further comprising executing a web browser to provide a service selected by the user.

15. The method according to claim 12, wherein the access point is provided in a plurality, and the connecting to the server belonging to the service area is made via an access point having a strongest signal strength from among the plurality of access points.

16. The method according to claim 12, wherein the server belonging to the service area comprises a DHCP server, and provides the contents using the Internet Protocol (IP) address provided by the DHCP server.

17. A method for providing a location based service to a user using a mobile terminal, the method comprising:

receiving server connection information for connection to a server by a near communication module of the mobile terminal;

connecting to a server belonging to a service area based on the server connection information;

receiving contents associated with the service area from the server automatically; and displaying the received contents, wherein the receiving contents associated with the service area from the server automatically comprises:

when the service area includes a specific area which the user has frequently visited, receiving a user private information from the user and registering the received user private information at the server of the service area including the specific area, and when the mobile terminal enters the service area including the specific area, providing a customized service to the user, which is provided from the server, according to the registered user private information, wherein the customized service includes a guide service to guide the specific area which the user has visited frequently in the service area, when the mobile terminal enters the service area, display a message for notifying that the mobile terminal enters the service area, download and execute automatically an application for providing the service related to the service area, display a main screen including a guide map for guiding the service area when the downloading of the application is completed, wherein the guide map represents a plurality of stores located in the service area, when one among the plurality of stores is selected by the user, display information on products provided by a selected store, wherein an Internet Protocol (IP) address of the server is the same as a server of another service area, wherein the server connection information does not include the Internet Protocol (IP) address of the server, and wherein the customized service further includes providing, to the user in the service area, real-time transportation schedule information on an area outside of the service area, the real-time transportation schedule information being received by the mobile terminal from another server or communication device located outside of the service area.

18. The method according to claim 17, wherein the contents comprise a list of available applications, and the near communication module receives an application from the server that is selected from the list by the user.

19. The method according to claim 17, further comprising executing a web browser to provide a service selected by the user.

20. The method according to claim 17, wherein the access point is provided in a plurality, and the connecting to the server belonging to the service area is made via an access point having a strongest signal strength from among the plurality of access points.

21. The method according to claim 17, wherein the server belonging to the service area comprises a DHCP server, and provides the content using the Internet Protocol (IP) address provided by the DHCP server.

22. The method according to claim 17, wherein the near communication module comprises at least one of a Near Field Communication (NFC) module and a Radio Frequency Identification (RFID) module.

* * * * *